United States Patent [19]

Yasui

[11] Patent Number: 4,606,578
[45] Date of Patent: Aug. 19, 1986

[54] HEAD-REST

[75] Inventor: Takashi Yasui, Akishima, Japan

[73] Assignee: Tachikawa Spring Co., Ltd., Akishima, Japan

[21] Appl. No.: 635,821

[22] Filed: Jul. 30, 1984

[30] Foreign Application Priority Data

Aug. 2, 1983 [JP] Japan .................. 58-120363[U]

[51] Int. Cl.$^4$ .................................. A47C 7/38
[52] U.S. Cl. ......................... 297/408; 297/410
[58] Field of Search ............ 297/408, 410, 409, 391, 297/399; 248/407, 408; 403/325

[56] References Cited

U.S. PATENT DOCUMENTS

| 3,100,661 | 8/1963 | Knight | 403/325 |
|---|---|---|---|
| 3,572,834 | 3/1971 | Herzer | 297/410 |
| 3,695,700 | 10/1972 | Flach | 297/408 |
| 4,099,779 | 7/1978 | Göldner | 297/408 |
| 4,191,423 | 3/1980 | Göldner | 297/410 |
| 4,256,341 | 3/1981 | Göldner et al. | 297/408 |
| 4,289,292 | 9/1981 | Kunjumon | 248/207 |
| 4,466,663 | 8/1984 | Oishi et al. | 297/410 |

FOREIGN PATENT DOCUMENTS

| 2312050 | 9/1974 | Fed. Rep. of Germany | 297/408 |
|---|---|---|---|
| 2,808,381 | 6/1979 | Fed. Rep. of Germany | 297/410 |
| 2,902,246 | 7/1980 | Fed. Rep. of Germany | 297/408 |
| 2945060 | 5/1981 | Fed. Rep. of Germany | 297/408 |
| 3200321 | 7/1983 | Fed. Rep. of Germany | 297/408 |

*Primary Examiner*—James T. McCall
*Assistant Examiner*—Mark W. Binder
*Attorney, Agent, or Firm*—Cushman, Darby & Cushman

[57] ABSTRACT

A head-rest is disclosed in which the lower ends of the stays are fixed to a seat frame of a seat back and a head-rest body is mounted to these stays in a manner that it is free to move in a vertical direction so as to provide a deeper recessed cavity in the rear of the seat back.

6 Claims, 6 Drawing Figures

HEAD-REST

BACKGROUND OF THE INVENTION

1. Field of the Invention

The present invention relates to an improved head-rest for use in a vehicle seat.

2. Description of the Prior Art

Conventionally, a head-rest comprises a head-rest body and head-rest stays integrally mounted to the head-rest body as well as vertically adjustable relative to a seat back. Therefore, the seat back is provided in its seat frame portion with a panel to cover the lower ends of the head-rest stays in order to secure the safety of an occupant in a rear seat against these lower ends.

Provision of such a panel, however, makes it difficult to provide a sufficient space for legs of the rear seat occupant in the rear of the seat back. This is a conventional problem to be solved.

SUMMARY OF THE INVENTION

The present invention is devised in view of the actual state of the conventional head-rest as mentioned above.

Accordingly, it is a principal object of the invention to provide an improved head-rest which eliminates the need for provision of a panel in a seat frame of a seat back.

In accomplishing this object, according to the invention, the lower ends of head-rest stays are respectively fixed to a seat frame of a seat back and a head-rest body is mounted to these head-rest stays in such a manner that the head-rest body is free to move in a vertical direction.

The above and other related objects and features of the invention will be apparent from a reading of the following description of the disclosures found in the accompanying drawings and the novelty thereof pointed out in the appended claims.

DETAILED DESCRIPTION OF A PREFERRED EMBODIMENT OF THE INVENTION

Figure 1:
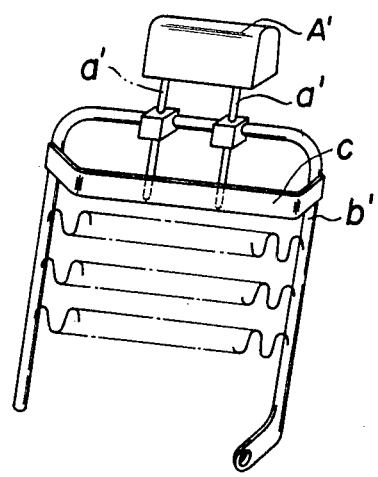
FIG. 1 is a perspective view of a conventional head-rest.
Figure 3:
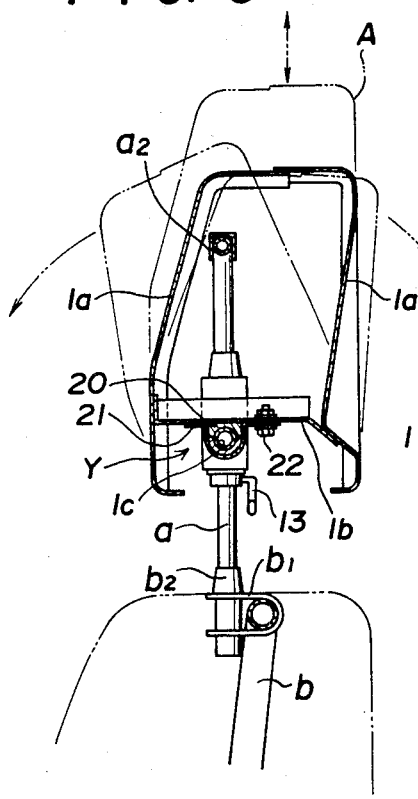
FIG. 3 is a longitudinally sectional view taken along line III—III in FIG. 2.
Figure 2:
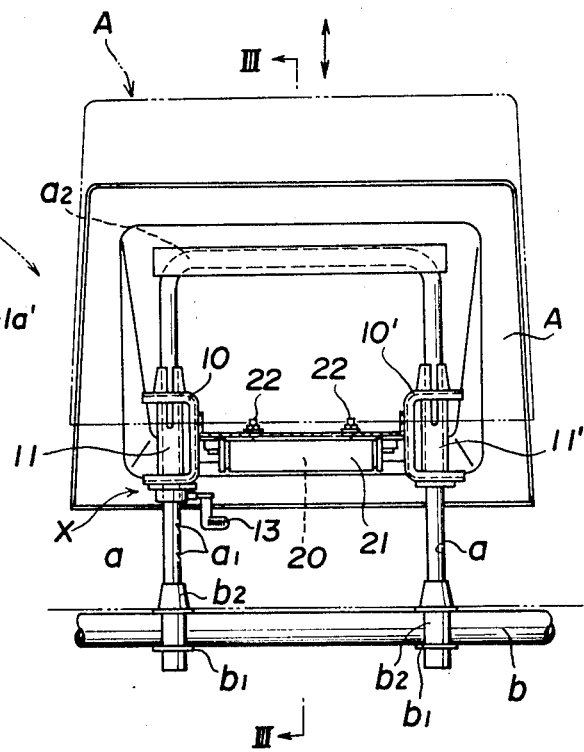
FIG. 2 is a partially cutaway front view of an embodiment of the invention.

For better understanding of the invention, at first, we will describe a conventional head-rest with reference to FIG. 1.

In a conventional head-rest of this type, as shown in FIG. 1, head-rest stays (a')(a') are integrally mounted to a head-rest body (A') in such a manner that they can be adjusted freely in a vertical direction. Thus, to cope with the vertical movements of the stays (a')(a'), a panel (c) to cover the lower ends of the stays (a')(a') is provided in a seat frame (b') of a seat back so as to be able to secure the safety of an occupant in a rear seat (that is, to prevent the knees or other parts of the rear seat occupant from being abutted against the lower ends of the head-rest stays (a')(a') and thus from being damaged). Accordingly, with such conventional head-rest, because the panel (c) provided in the seat frame (b) provides an obstacle, it has been difficult to prepare a sufficient space for legs of the rear seat occupant behind the seat back.

Next, we will describe an embodiment of the invention in connection with FIGS. 2 to 6 in detail.

In the illustrated embodiment of the invention, head-rest stays are respectively fixed to a seat frame of a seat back and a head-rest body is mounted to these stays in such a manner that it can be freely moved in a vertical direction, so that the drawback in the above-mentioned prior art head-rest is eliminated. Accordingly, since the head-rest body is so mounted to the stays as to be freely movable in a vertical direction, it is quite natural that a lock mechanism or device for limiting the vertical movements of the head-rest body is installed to the head-rest body. Similarly, when the head-rest is of a longitudinal inclination type, an associated inclination mechanism is naturally provided in the the head-rest body.

In the drawings, (a)(a) designate stays respectively. These stays (a)(a) are respectively fixed to the respective brackets $(b_1)$ $(b_1)$ of a seat frame (b) at their lower ends. One of the stays (a) is formed with a plurality of engagement grooves $(a_1)$ $(a_1)$—for vertical adjustment which are located at predetermined intervals in a vertical direction. The upper ends of both stays (a)(a) are integrally connected to each other by means of a reinforcing rod $(a_2)$.

Seat frame (b) is formed of a pipe or a metal plate, as with conventional ones.

Head-rest body (A) can be adjusted vertically as well as longitudinally by means of a vertical adjustment mechanism (X) and an inclination mechanism (Y).

Head-rest body (A) comprises front and rear plates (1a)(1a') each formed of a hard material, a support plate (1b) interposed between the two plates (1a)(1a'), and a support shaft (c) extending right and left of the support plate (1b). Onto the outside surfaces of the plates (1a) (1a') is mounted a cushion member which is in turn covered by a top member.

This vertical adjustment mechanism (X) of the head-rest body (A) comprises a bracket (10) fixed to the end of the support shaft (1c), a holder (11) mounted to the bracket (10), and a lock mechanism provided in the holder (11). The bracket (10) is a U-shaped metal plate and is formed in its upper and lower portions with through-bores for insertion of the holder (11). The holder (11) is formed with an elongated groove (11a) and is inserted into the bracket (10).

Holder (11) is also provided at its upper and lower ends with flange portions (11b)(11b'). Between these two flange portions (11b)(11b') is mounted the bracket (10) to prevent the holder (11) from escaping from its position. A lock mechanism is provided in the flange portion (11b) formed at the lower end of the holder (11) so as to fix the head-rest body (A) in position.

This lock mechanism comprises a stopper (12) formed of a spring to be engaged into the engagement grooves $(a_1)$ $(a_1)$—of the stay (a), and an operation lever (13) for releasing the engaged state of the stopper (12). The stopper (12) is disposed in a slit (14) formed in the thick flange portion (11b) such that it is secured to a projection (15) at one end thereof and is biased in a direction toward the stay (a). The operation lever (13) is arranged to be able to release the engaged condition of the stopper (12) by rotating the other end of the stopper (12) against the elasticity of the stopper (12), as well as to be able to project out from the bottom portion of the head-rest body (A). In the drawings, (10') designates the same bracket as the above-mentioned bracket (10). Also, (11') stands for a holder with no lock mechanism.

In this manner, when the operation lever (13) is operated to release locking (that is, the engaged state of the stopper (12)), the head-rest body (A) is free to move vertically so that the height of the head-rest body (A) can be adjusted to a desired position.

Figure 5:
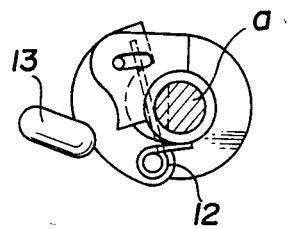
FIG. 5 is a schematic view of the lock device, illustrating a state in which the locking of the same is released; and, FIG. 6 is a schematic view of the lock device, illustrating a state in which the lock device is being locked.
Figure 6:
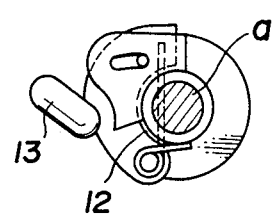
Figure 4:
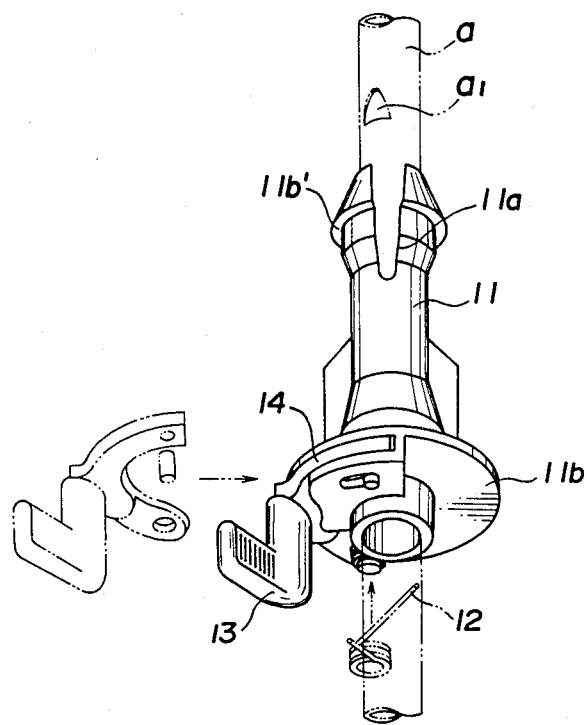
FIG. 4 is an exploded perspective view of a lock device in the vertical adjustment mechanism of the invention.

Now, FIG. 5 illustrates a state in which a locked or engaged condition is released, and FIG. 6 illustrates a state in which the locked condition is maintained.

Inclination mechanism (Y) to control or adjust the head-rest body (A) longitudinally is arranged such that it connects the support plate (1b) to the support shaft (1c) via a plate (21) in a free-to-rotate manner and fixes the head-rest body (A) by means of the frictional resistance between a bush (20) and the support shaft (1c). In the drawings, (22) represents a locking bolt which fastens a U-shaped plate (21) embracingly carrying a plastic bush (20) to the support plate (1b) with a predetermined fastening force.

Thus, if the head-rest body (A) is pushed to move in a logitudinal direction against the frictional resistance between the support shaft (1c) and the bush (20), then the head-rest body (A) is inclined in a longitudinal direction and thus is adjusted in position longitudinally.

As described before, according to the invention, the stays are fixed to the seat frame of the seat back, so that there eliminates the need to provide a panel in the seat frame as in the prior art head-rests. Therefore, no need of a panel allows a deeper recessed cavity in the rear of the seat back over the conventional head-rests and thus a space for legs of the rear seat occupant can be expanded accordingly. In addition, according to the invention, the head-rest vertical and longitudinal adjustment devices can be provided within the head-rest body, so that the seat back can be assembled in a simple and easy manner and thus can be supplied at low costs.

What is claimed is:

1. A head rest for a vehicle seat comprising, in combination:

a pair of separated elongated head rest stays;

means adapted for rigidly connecting a lower end of each said head rest stay to said vehicle seat such that said head rest stays extend above said vehicle seat;

a head rest body having forward and rearward separated walls and a central support plate rigidly connected at each of its respective ends to said forward and rearward walls such that said support plate is positioned within a space defined between said separated head rest stays;

adjustment means for coupling said head rest body to said head rest stays to permit said head rest body to be reciprocally movable relative to said head rest stays between raised and lowered positions and to permit said head rest body to be pivotally movable about an adjustment axis between forward and rearward inclined positions, said adjustment means including:

(a) a pair of holders each defining an elongate aperture for slidably receiving a respective one of said head rest stays therein such that each said holder is slidable along said respective head rest stay between positions corresponding to said raised and lowered positions of said head rest body;

(b) a support shaft extending transversely to said support plate and rigidly interconnecting said pair of holders to establish said adjustment axis;

(c) coupling means for coupling said support plate to said support shaft, (d) said coupling means including friction retaining means for frictionally gripping said support shaft to retain said head rest body in one of a plurality of inclined positions between said forward and rearward positions, inclusive, while yet permitting said head rest body to be forcibly pivoted about said adjustment axis into said one inclined position, wherein (e) said coupling means also couples said support plate to each said holder via said support shaft such that said support plate, and thus said head rest body, is reciprocally movable together with said holders between said raised and lowered positions when said holders are slidably moved along said head rest stays.

2. A head rest as in claim 1 wherein said coupling means includes a cylindrical friction bushing surrounding said support shaft in frictional engagement therewith, and a bracket to couple said friction bushing to said support plate.

3. A head rest as in claim 1 wherein said support shaft at each end thereof includes a holder bracket, each said holder bracket, in turn, being connected to a respective one of said holders.

4. A head rest as in claim 1 further comprising lock means for removably locking said head rest body in one of a plurality of height positions between said raised and lowered positions, inclusive.

5. A head rest as in claim 4 wherein one of said holders includes a lower flange defining a slot transverse to said respective one of said head rest stays, and wherein said lock means includes (i) plural longitudinally spaced notches defined in said respective one head rest stay, (ii) a stopper member pivotally connected to said flange and positioned within said slot so as to be transversely pivotal relative to said respective one head rest stay between an engaged position wherein a respective one of said notches is engaged and a disengaged position wherein said stopper member is disengaged from said notches, and (iii) spring means for biasing said stopper member into said engaged position.

6. A head rest as in claim 5 wherein said stopper member includes a lever to permit said stopper member to be manually moved between said engaged and disengaged positions.

* * * * *